(12) United States Patent
Moore

(10) Patent No.: US 7,552,268 B2
(45) Date of Patent: Jun. 23, 2009

(54) METHOD FOR IMPROVING BUS UTILIZATION USING PREDICTIVE ARBITRATION

(75) Inventor: John Moore, Solvang, CA (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 11/438,054

(22) Filed: May 18, 2006

(65) Prior Publication Data

US 2007/0271405 A1 Nov. 22, 2007

(51) Int. Cl.
G06F 13/36 (2006.01)
(52) U.S. Cl. .................................. 710/309; 710/116
(58) Field of Classification Search ................. 710/309, 710/113–118
See application file for complete search history.

(56) References Cited

U.S. PATENT DOCUMENTS

| 5,471,590 | A | * | 11/1995 | Melo et al. | 710/108 |
| 5,581,790 | A | * | 12/1996 | Sefidvash | 710/34 |
| 5,668,815 | A | * | 9/1997 | Gittinger et al. | 714/719 |
| 5,764,929 | A | * | 6/1998 | Kelley et al. | 710/107 |
| 5,796,968 | A | * | 8/1998 | Takamiya | 710/113 |
| 5,822,595 | A | * | 10/1998 | Hu | 710/264 |
| 6,823,477 | B1 | * | 11/2004 | Cheng et al. | 714/26 |
| 7,313,642 | B2 | * | 12/2007 | Kawaguchi | 710/309 |

FOREIGN PATENT DOCUMENTS

EP 665500 A1 * 8/1995

OTHER PUBLICATIONS

PCI Special Interest Group, "PCI Local Bus Specification", Aquired at: http://www.ece.mtu.edu/faculty/btdavis/courses/mtu_ee3173_f04/papers/PCI_22.pdf, Chapter 3—"Bus Operation" Section 3.3, 3.4 and 3.5, pp. 46-88, Revision 2.2, Dec. 18, 1998.

* cited by examiner

Primary Examiner—Paul R Myers
(74) Attorney, Agent, or Firm—Trellis IP Law Group, PC

(57) ABSTRACT

A PCI bridge device includes an arbiter that uses state information comprised of knowledge of the bus protocol and a history of recent transactions to predict the type of transaction a requestor will issue. The prediction is then used as a basis to mask or allow bus requests from the requester. The arbiter does not grant access to devices that will predictably issue transactions that do not result in the transfer of data. This approach can decrease time wasted by devices attempting unsuccessful transactions and can provide a commensurate increase in bus utilization. The overall effect is an increase in average bus bandwidth and a decrease in average data transfer latencies.

21 Claims, 4 Drawing Sheets

| INPUT # | LOGIC BLOCK | LOGIC FUNCTION | CASE # | | | | | | | |
|---|---|---|---|---|---|---|---|---|---|---|
| | | | 1 | 2 | 3 | 4 | 5 | 6 | 7 | 8 |
| 1 | 212 | REQUESTOR ISSUED READ RETRY ? | YES | YES | YES | YES | YES | YES | YES | NO |
| 2 | 212 | REQUIRED TO RETRY ? | YES | YES | NO | NO | NO | YES | NO | X |
| 3 | 214 | MASK ALL RETRIES ? | X | X | YES | YES | NO | X | YES | X |
| 4 | 212 | DATA AVAILABLE FOR THIS REQUESTOR ? | NO | YES | NO | YES | X | NO | NO | X |
| 5 | 214 | OPTIMIZATION ENABLED FOR THIS REQUESTOR ? | YES | YES | YES | YES | X | NO | NO | X |
| | 210 | MASK REQUEST ? | YES | NO | YES | NO | NO | NO | NO | NO |

Fig. 3

METHOD FOR IMPROVING BUS UTILIZATION USING PREDICTIVE ARBITRATION

BACKGROUND OF THE INVENTION

This invention relates to arbitrating requests by devices in a computer system for a shared resource and more particularly to an arbiter that grant bus requests using an arbitration scheme that maximizes bus utilization through transaction prediction.

Arbiters are used in computer systems to control access to a common bus used by multiple devices. Arbiters insure that only a single device uses the bus at one time, and that all requesting devices are fairly allocated use of the bus. Arbiters use various arbitration schemes to grant access to each requesting device based on an algorithm that attempts to insure fair access to the shared bus. Various common algorithms exist such as round-robin, rotating priority, weighted priority, and history-based arbitration. Arbiters based on these algorithms are typically limited to observing a request per device and generating a grant per device, with the possible inclusion of a minimum number of bus control signals to synchronize the arbitration according to the bus protocol. Specifically, these arbiters are limited in scope to allowing each device 'access' to a bus, without taking into account the transactions generated by the devices once they are granted access. While this limitation allows the arbiter itself to be relatively simple compared to the operation of the associated bus, it deprives the arbiter of state information that would be useful in further determining if a device should be granted. More specifically, it prevents the arbiter from predicting the type of bus transaction a requestor will issue once granted the bus. Without this state information, granted devices can issue transactions that will predictably not result in the transfer of data, resulting in degraded bus bandwidth and increased latency for all devices sharing the bus. Predicting the type of bus transaction a requestor will issue if granted the bus allows the arbiter to prioritize the requesters in a manner that maximizes bus utilization.

BRIEF DESCRIPTION OF THE DRAWINGS

FIG. 3 is a truth table for the arbiter subsystem shown in FIG. 2.

DETAILED DESCRIPTION OF EMBODIMENTS OF THE INVENTION

Figure 1:
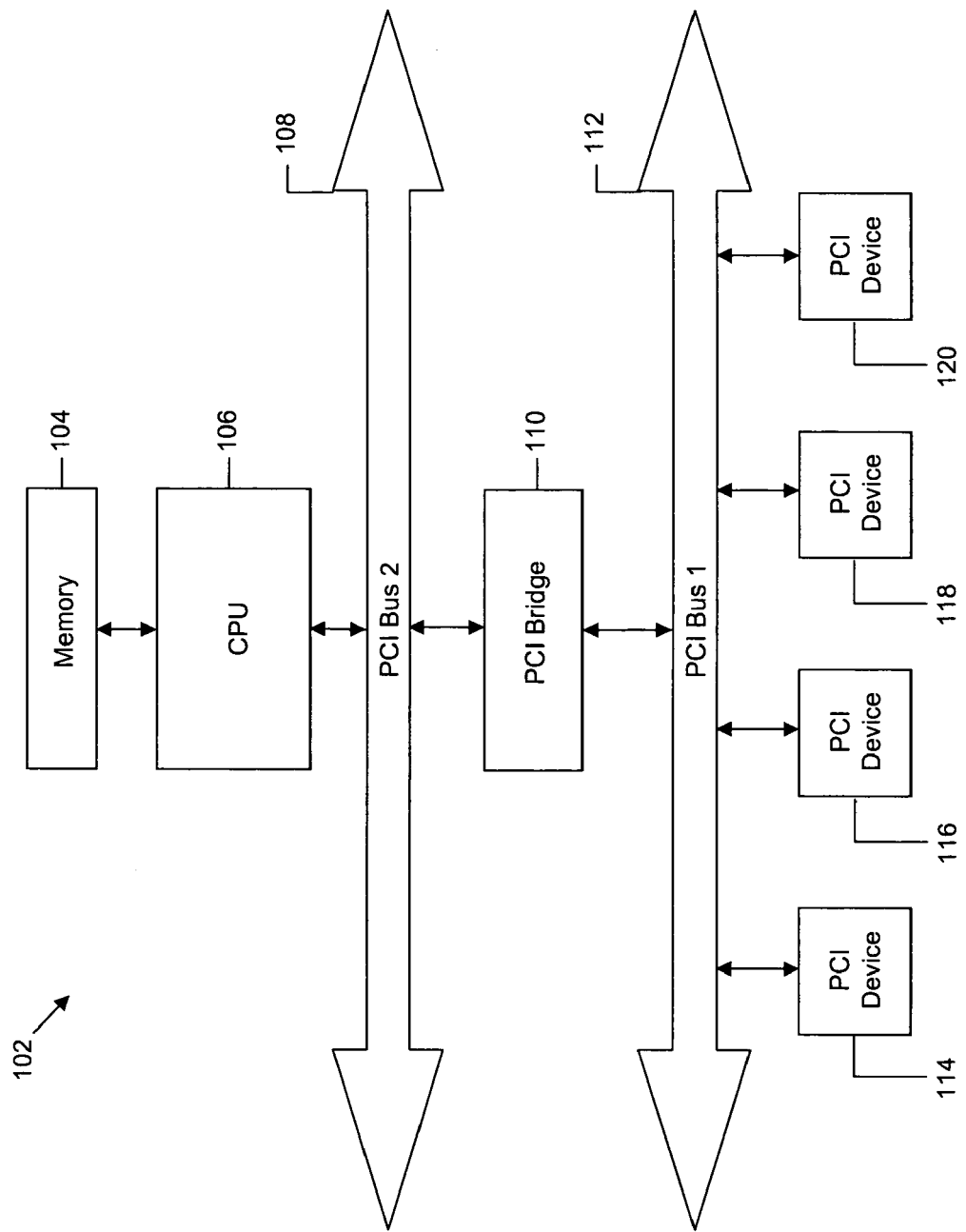
FIG. 1 is a block diagram of a typical system employing a bridge to connect multiple devices on a shared bus to an upstream bus.

In a preferred embodiment, an arbiter uses state information comprised of knowledge of the bus protocol and a history of recent transactions to predict the transaction a requester will issue and includes this state information to select which requestor will be granted. Specifically, the arbiter does not grant access to devices that will predictably issue transactions that do not result in the transfer of data. This approach can decrease time wasted by devices attempting unsuccessful transactions and can provide a commensurate increase in bus utilization. The overall effect is an increase in average bus bandwidth and a decrease in average data transfer latencies.

In one embodiment, a computer system uses a Peripheral Component Interface (PCI) bus with multiple devices sharing access to a shared memory. The protocol of the PCI bus is established in published specifications such as "PCI Local Bus Specification 2.2" available from www.pcisig.com. In the PCI bus specifications, requestors are termed initiators, and addressed devices are termed targets. An "initiator" or "requestor" device includes any device attempting to initiate or continue a transaction with another device over a bus. The "target device" can be any device with which an initiator attempts to perform a transaction. A transaction can include a transfer of data or other operation. In one embodiment, a PCI bridge aggregates transactions on the shared bus and regenerates them on an upstream bus that accesses the shared memory. In this embodiment, the PCI bridge also contains the arbiter for the bus. In this system, the PCI bridge acts as the target of all transactions issued by devices addressing the shared memory.

Typically, the latency to access contents of the shared memory is long compared to the PCI bus transaction itself. Specifically, a read issued by a device on the shared PCI bus which addresses a location in the shared memory will require a chain of events to occur before the requested data is delivered to the initiating device. This latency is unavoidable in the case of random read accesses. The PCI specification provides a mechanism for a target to inform an initiator that the read transaction cannot be completed at this time and that the current transaction should be discontinued. This frees the bus to be used by other devices and increases bus efficiency. This is termed a 'disconnect' by the PCI specification. There are several types of disconnects defined by the PCI specification in order to cover all cases and insure fairness of bus usage. All cases are defined as to whether any data is transferred (termed disconnect with data) or no data is transferred (termed disconnect without data). In the case of a read terminating via a disconnect without data, the specification further dictates that the initiator must retry this read if the disconnect was issued in the first data phase, i.e. this is the first issuance of the read to this address and no data has been transferred. This type of disconnect is generally called a 'retry'.

In one embodiment, the PCI bridge issues a retry to the initiating device on the shared PCI bus if the addressed data is not yet available. Specifically, retries will be issued until the PCI bridge has itself received the data. Given the requirement by the specification to retry a read that was terminated via a disconnect without data in its first data phase, the initiator will predictably re-issue the read to the same address. Further, given the relationship between the typical read access time of a shared memory and the time required for an initiator to re-issue a read and be terminated via a retry, it is probable that an initiator will issue multiple reads, each retried, until the addressed data is finally available in the PCI bridge. These retried reads transfer no data and so decrease bus efficiency.

The inefficiency is compounded if multiple devices on the shared bus are issuing reads to shared memory that are also being retried. In a typical round-robin arbiter, these requestors would simply be granted access solely based on that algorithm, and would take turns retrying each of their reads. When data for one initiator was finally available in the bridge, that initiator would still have to wait its turn based on the algorithm while other initiators retry their respective reads.

An arbiter that includes the knowledge of mandatory retrying of reads along with the availability of data for each requestor by associating the requestor with the data would be able to selectively deny grants to requestors which will predictably be retried. In one embodiment, this capability could be added to existing arbitration schemes, possibly as simply as a selective mask of the incoming requests. This would allow existing schemes to be augmented without modifying their design, resulting in an incremental improvement in overall bus efficiency while preserving all the benefits of the original arbitration algorithm.

In another embodiment, the algorithm is extended to include all requestors that have been issued a read retry by a target. While this can eliminate virtually all read retries in a system and maximize bus efficiency, the PCI specification only requires reads to be retried under the conditions already stated. Other disconnects, both with and without data, are not required to be retried for various reasons relating to fairness, etc. However, if a system designer understands the behavior of a PCI device sufficiently to guarantee that all reads terminated with a disconnect will be retried by the device, then suppressing these retries via suppression of the grant to the device until the read data is available results in improved efficiency of the bus. Given the conditional nature of its use in this case, the algorithm contains a user-selectable, per request mask to enable or disable this level of coverage. In another embodiment, a user-selectable mask can also be applied to the entire invention, allowing individual request/grant signals to be excluded from the optimization, bypassing the proposed masking of requests and disabling the optimization algorithm. One use for such a mask might be the measuring of its effectiveness in a given system.

In the preferred embodiment, the arbiter is part of the PCI bridge device. This allows access to all information required to determine if requesters have outstanding, unfulfilled reads that are required to be retried, and if the requested data is available within the bridge. It also facilitates the implementation of the user-selectable masks for disabling the optimization algorithm on a per device basis. Other embodiments may implement functions described herein, in whole or in part, outside of the PCI bridge.

In one embodiment the invention provides a method for arbitrating a read operation at a bridge device, wherein the bridge device is coupled to first and second buses, wherein an initiator device is coupled to the first bus, wherein a bus protocol requires that the initiator perform retries in order to complete the read operation with a target device coupled to the second bus, the method comprising: identifying a retry as associated with the initiator; determining that data associated with the identified retry will not be available in a predetermined storage location; and denying a bus grant to the initiator based on the identifying and determining.

In another embodiment the invention provides a PCI bridge device comprising: a first PCI bus interface for coupling to an initiator device via a first PCI bus; a second bus interface for coupling to a target device via the second bus; and first circuitry for masking a bus request signal from the initiator device, wherein the bus request signal is masked in response to a prediction that the initiator device will request data that is not stored at the bridge device.

Referring to FIG. 1, a PCI system 102 is shown with four devices 114, 116, 118, and 120 sharing bus 112. These devices access shared memory 104 via PCI Bridge 110, PCI bus 108, and CPU 106, whose functions are well established and known to those skilled in the art. CPU 106 contains a PCI port and allows this port access to shared memory 104. PCI Bridge 110 contains an arbiter 208 shown in FIG. 2 which grants access to the devices sharing bus 112. Only one device is granted control of bus 112 at one time in order to initiate transactions on that bus. The arbitration scheme implemented in arbiter 208 insures requesters fair access to bus 112. Signals comprising bus 112 include unique (i.e., out-of-band dedicated signal lines for each PCI device) request and grant signals between each PCI device 114, 116, 118, and 120 and arbiter 208 in PCI bridge 110. Arbiter 208 uses these unique request and grant signals to decide which device is granted access to bus 112.

Figure 2:
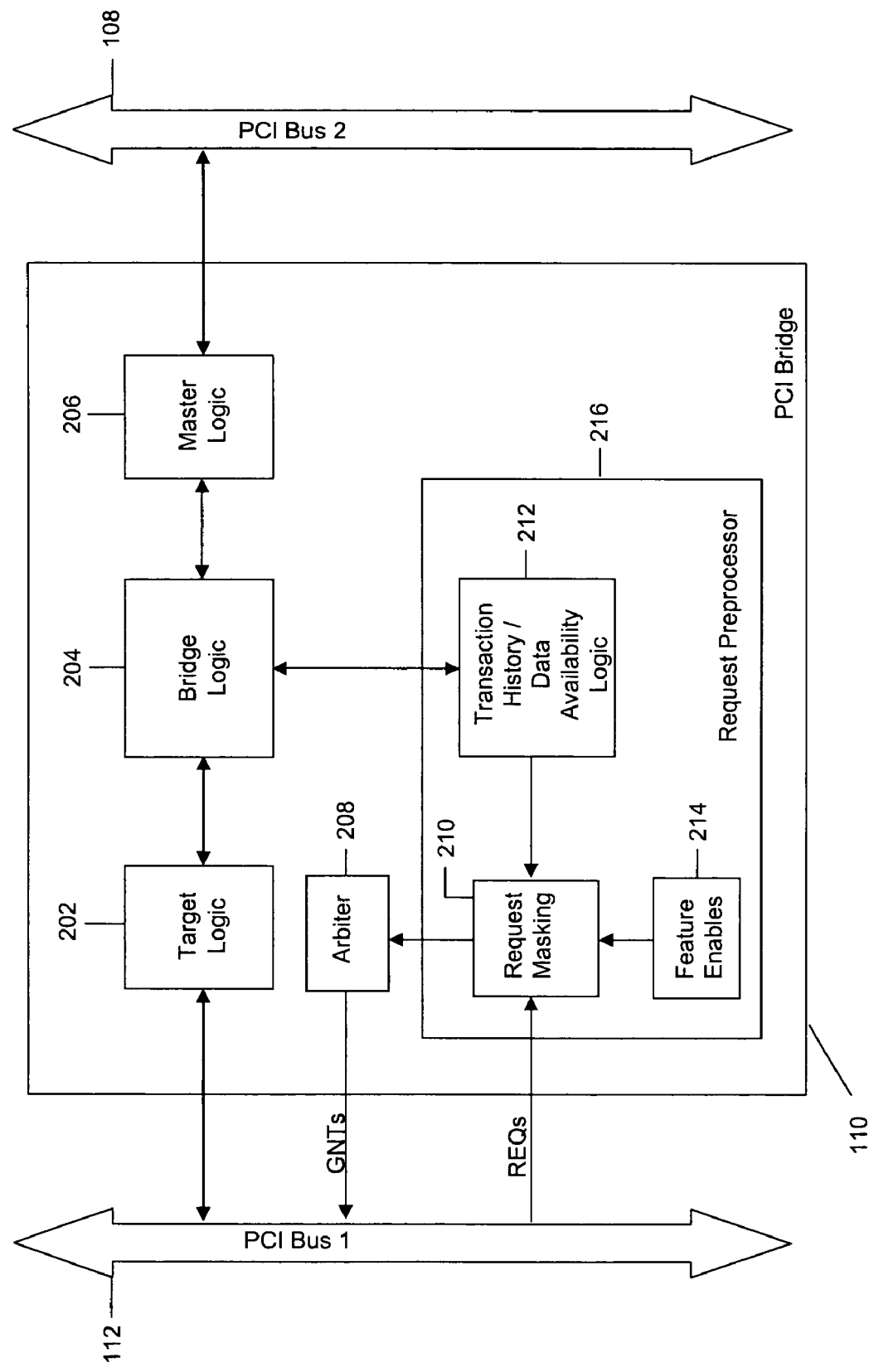
FIG. 2 is a detailed block diagram of the bridge shown in FIG. 1 containing an arbiter with the enhanced capabilities described in the invention.

Referring to FIG. 2, the preferred embodiment, PCI bridge 110, includes an arbiter 208 and the request preprocessor 216. The request preprocessor 216 includes transaction history and data availability logic 212, request masking logic 210, and feature enables 214. These three components each perform a portion of the calculation to decide whether to mask incoming requests from devices on PCI bus 112 and pass the unmasked requests to arbiter 208 for final selection of the granted device. The masking of requests is transparent to arbiter 208. The algorithm employed in arbiter 208 can be any of the variety common in this application, namely round-robin, rotating priority, weighted priority, or history-based arbitration. In general, any arbitration approach can be used, including future-developed arbitration schemes. The request preprocessor 216, then, augments the arbitration process by masking requesters that it has predicted will issue read transactions that will be retried. It makes this prediction based on its knowledge of transaction history and data availability, stored in the transaction history and data availability logic 212. User-selectable feature enables 214 allow the masking of requests to be enabled or disabled in the request preprocessor 216 on a per-request basis.

The logic used in the request preprocessor 216 is expressed in the truth table in FIG. 3. The request preprocessor makes a binary decision to either pass the request from each device attached to PCI bus 112 to arbiter 208 or to selectively mask one or more of them. The truth table in FIG. 3 defines how the decision is made to mask an individual request based on the transaction history, data availability, etc. of the associated device. This logic can be extended to cover N requestors corresponding to N devices connected to PCI bus 112. In one embodiment, this logic could reside in a Programmable Logic Device (PLD). In one embodiment, the implementation could be realized through synthesis of a High-level Design Language (HDL) such as Verilog or VHDL. In another embodiment, the implementation could be realized using a Look Up Table (LUT) residing in a Random Access Memory (RAM), either internal to or external to a PLD.

There are eight (8) cases defined in the table in FIG. 3. These eight cases represent all valid combinations of the inputs into the logic equation represented by the truth table. There are five (5) inputs in the truth table, and each input is generated by a specific function within the request preprocessor 216. Input #1 is generated by the transaction history and data availability logic 212. This input can be a single logic bit that records the occurrence of the issuance of a retry by target logic 202 to the associated device 114, 116, 118, or 120 in response to that device issuing a read transaction on PCI bus 112. The retry is defined as either a Disconnect With Data or Disconnect Without Data, with the exception of Target Abort, where no retry is expected. These semaphores, signaled using various control signals comprising the PCI bus, are defined in the PCI Specification and generally understood by those skilled in the art. The transaction history and data availability logic 212 monitors all signals from PCI bus 112 required to detect the occurrence of the issuance of a retry to a device on PCI bus 112 in response to that device issuing a read transaction on PCI bus 112. Once set valid, input #1 will remain valid until the associated device successfully terminates the read transaction without a retry being issued.

Input #2 in the truth table in FIG. 3 is also generated by the transaction history and data availability logic 212. This input further defines the type of retry detected as being a Disconnect Without Data issued during the first data phase of a read transaction issued by the associated PCI device on PCI bus 112. This input, once set valid, will remain valid until at least one of the requested data is delivered to the requesting device as part of a subsequent read transaction. Using inputs #1 and #2, the transaction history and data availability logic 212 can determine a read retry has been issued, and can further predict if the associated device will re-issue the read transaction if subsequently granted the bus. In case #1, #2, and #6 both inputs #1 and #2 are valid, and the device that was issued the retry will re-issue the read in compliance with the PCI Specification. In case #3, #4, #5, and #7 input #1 is valid but input #2 is invalid, and the device issued the retry may re-issue the read. Knowledge of the specific device's behavior is used to determine if the device will always re-issue a read in this case. For example, if it is known that the device will retry all reads when the device is disconnected prior to completion of a read transaction, then a higher degree of efficiency (i.e., bus utilization or bandwidth) can be achieved by using request masking as described herein. Input #3 is a user-selectable dedicated enable stored in feature enables 214 that can be used to disable masking of a request in the case where input #1 is valid but input #2 is invalid. In case #8, input #1 is invalid, and input #2 becomes a "don't care" (X) and is ignored in the equation. The mask request output is always inactive in this case.

Input #4 in the truth table in FIG. 3 is generated by the transaction history and data availability logic 212. This input can be a single bit that indicates at least one of the data elements requested by the associated device on PCI bus 112 which issued a read transaction that was terminated by a retry has been received by master logic 206 and is now available to target logic 202. This corresponds to case #2 and #4, which unconditionally allow the associated device's request to pass unmasked through request masking 210 and on to arbiter 208. When the associated device is granted the bus by arbiter 208 and target logic 202 delivers at least one data element as part of the read transaction, input #2 will become invalid. If the read transaction terminates without a retry being issued by target logic 202, then input #1 becomes invalid, and the truth table advances to case #8. Conversely, if all available data within PCI bridge 110 associated with this read transaction is transferred to the associated device on PCI bus 112 resulting in another read retry being issued to that device, input #1 will remain valid, input #2 will remain invalid, and input #4 will become invalid, corresponding to case #3, #5, and #7. In case #3, the associated request will again be masked by request masking 210 until input #4 again becomes valid and the truth table advances to case #4. In case #5, the associated request will not be masked due to input #3 being invalid. Input #5 in the truth table in FIG. 3 is a user-selectable dedicated enable stored in feature enables 214 that enables request masking on a per-request basis. It must be valid for any masking of the associated request to occur. In case #6 and #7, this input is invalid and overrides all other inputs resulting in the associated device's request passing unmasked to arbiter 208.

Figure 4:
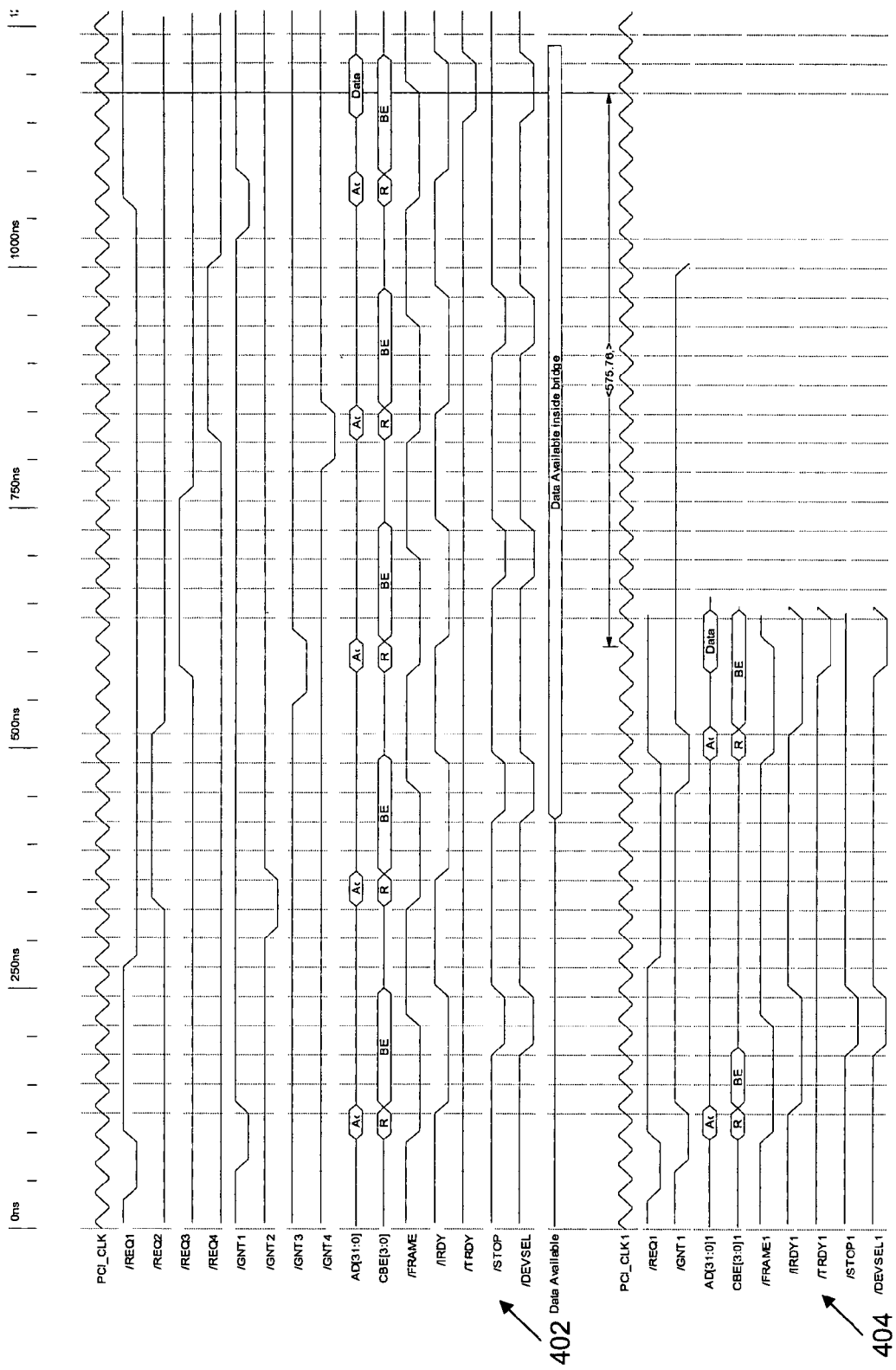
FIG. 4 is a timing diagram showing bus transactions for the system in FIG. 1.

The timing diagrams in FIG. 4 show a scenario involving the four PCI devices 114, 116, 118, and 120, whose request signals correspond to signals /REQ1, /REQ2, /REQ3, and /REQ4 respectively. The bus is operating at 33 MHz. In this scenario, all four devices are being issued retries with no data transferred. For this scenario, the retries are mandatory per the PCI specification, and so are predictable by request preprocessor 216 (corresponding to case #1 in the truth table in FIG. 3). Timing diagram 402 shows a typical round-robin arbitration scheme where each device is granted without regard to the availability of data for each device's read request. In diagram 402, the Data Available bus indicates when data becomes available inside PCI bridge 110 for device 114, corresponding to /REQ1. Because a simple round-robin algorithm dictates which device is granted access to PCI bus 112 in this example, device 114 must wait until all other devices have attempted their transactions before it can then retry its read and finally receive its requested data.

Timing diagram 404 shows the effect of employing the request preprocessor 216 to mask requests from devices on PCI bus 112 that have been issued retries that are mandatory. In this timing diagram, device 114 is issued a mandatory retry after being granted the bus. Devices 116, 118, and 120 were previously issued mandatory retries and their requests, /REQ2, /REQ3, and /REQ4 (not shown) are asserted as in timing diagram 402 but are being masked from arbiter 208. Device 114's request, /REQ1, is also masked immediately following the issuance of the mandatory retry and is shown asserted on the bus but is not visible to arbiter 208. When device 114's data becomes available inside PCI bridge 110, the /REQ1 signal is unmasked (case #2 in the truth table in FIG. 3). The other devices' requests, /REQ2, /REQ3, and /REQ4, remain masked in request masking 210 within the request preprocessor 216. As a result, device 114 is granted the bus and completes its read transaction. In this scenario, the read latency experienced by device 114 is 575 ns less due to the masking of requests by the request preprocessor 216.

Although the invention has been described with respect to specific embodiments thereof, these embodiments are merely illustrative, and not restrictive of the invention. For example, busses and protocols other than PCI may be used. Currently, there are a few bridges in the market that bridge the PCI bus to other busses. Notably, the emergence of newer busses such as PCI Express and RapidIO have prompted creation of bridge devices to support legacy PCI devices. These bridges have a legacy PCI bus on the downstream side and the newer bus as the upstream. These new bridges could benefit from this invention in that they would maximize bandwidth on the legacy PCI bus they attach to. This would lend more useful life to this invention as the purely legacy PCI to PCI bridges are quite long in the tooth. Other bus applications are possible.

In other embodiments, functions or portions of functions may be performed in hardware, software or a combination of both. Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for arbitrating a read operation at a bridge device, wherein the bridge device is coupled to first and second buses, wherein an initiator device is coupled to the first bus, wherein a bus protocol requires that the initiator perform retries in order to complete the read operation with a target device coupled to the second bus, the method comprising:

determining transaction history information related to a prior read request by the initiator, the transaction history relating to a result of the prior read request;

determining whether data associated with the prior read request will be available in a predetermined storage location;

predicting whether a read request will be re-tried because the read request will not be fulfilled if the initiator is granted access to the second bus based on a combination of inputs including the transaction history and data availability in the predetermined storage location before allowing the read request to be sent to an arbitrator, the read request associated with the initiator;

masking the read request and one or more read requests being re-tried associated with the initiator such that the read request and one or more read requests being re-tried are not sent to the arbitrator configured to arbitrate access to the second bus when the prediction indicates the read request will be re-tried and the data is not available; and allowing the read request being re-tried to be sent to the arbitrator such that the arbitrator may arbitrate access to the second bus with the read request being re-tried for the read request when the prediction indicates the data will be available when the read request is allowed access to the second bus.

2. The method of claim 1, wherein the combination of inputs includes a first input indicating whether the initiator was issued a retry in the prior read request, a second input indicating whether the initiator is required to retry the read request, a third input indicating whether all retries should be masked, wherein the prediction is determined based on information for the first input, second input, and third input.

3. The method of claim 1, further comprising masking the read request and the one or more read requests being retried from the initiator device in accordance with a probability that the read request and the one or more read requests being retried will be subjected to a subsequent retry.

4. The method of claim 3, further comprising:
determining that the read request has been re-tried; and
determining that the read request will be re-tried if a grant for the first bus is made to the initiator device.

5. The method of claim 4, further comprising using the initiator device's known behavior as an input in addition to the transaction history and the data availability in determining that the read request will be re-tried if a grant for the first bus is made to the initiator device.

6. The method of claim 1, further comprising masking read requests being retried from the initiator device based on an input of a user-selectable setting.

7. The method of claim 6, wherein the user-selectable setting is on a per-request basis.

8. The method of claim 6, wherein the user-selectable setting causes all requests from the initiator device to be unmasked.

9. The method of claim 1, wherein the data associated with the identified read request being re-tried is stored in a cache at the bridge device.

10. The method of claim 1, wherein the first bus operates in accordance with PCI bus specifications.

11. A PCI bridge device comprising:
a first PCI bus interface for coupling to an initiator device via a first PCI bus;
a second bus interface for coupling to a target device via the second bus; and
first circuitry for:
determining transaction history information related to a prior bus request signal by the initiator, the transaction history relating to a result of the prior bus request signal;
determining whether data associated with the prior bus request signal will be available at the bridge device;
predicting whether a bus request signal and one or more bus request signals being re-tried will request data that is not stored at the bridge device if the initiator device is granted access to the second bus based on a combination of inputs including the transaction history and data availability at the bridge device before allowing the read request to be sent to an arbitrator, the read request associated with the initiator device;
masking the bus request signal and one or more bus request signals being re-tried from the initiator device such that the bus request signal and one or more bus request signals being re-tried are not sent to the arbitrator configured to arbitrate access to the second bus, wherein the bus request signal is masked in response to the prediction that the initiator device will request data that is not stored at the bridge device;
determining when data associated with the identified bus request signal is available in the predetermined storage location; and
unmasking the bus request signal being re-tried such that the bus request signal being re-tried is sent to the arbitrator and the arbitrator may arbitrate access to the second bus for the unmasked bus request signal.

12. The PCI bridge device of claim 11, wherein the first circuitry includes:
one or more storage media for storing transaction history data describing prior transactions;
data availability logic for indicating data that is stored at the bridge device;
request masking logic for masking the bus request signal; and
feature enables for controlling the masking according to a predetermined condition.

13. The PCI bridge device of claim 12, further comprising an arbiter for receiving unmasked bus requests and for arbitrating bus grants.

14. The PCI bridge device of claim 11, further comprising:
a request preprocessor for selectively masking bus requests according to one or more rules.

15. The PCI bridge device of claim 14, wherein a rule includes detecting whether a retry is of a type Disconnect Without Data.

16. The PCI bridge device of claim 14, wherein the Disconnect Without Data is generated in a first data phase of a read transaction issued by the initiator device.

17. The PCI bridge device of claim 14, wherein a rule includes detecting a condition set by a user.

18. An apparatus for arbitrating a read operation at a bridge device, wherein the bridge device is coupled to first and second buses, wherein an initiator device is coupled to the first bus, wherein a bus protocol requires that the initiator perform retries in order to complete the read operation with a target device coupled to the second bus, the apparatus comprising:
a processor for executing instructions;
a machine readable storage medium including instructions executable by the processor comprising one or more instructions for:
determining transaction history information related to a prior read request by the initiator, the transaction history relating to a result of the prior read request;
determining whether data associated with the prior read request will be available in a predetermined storage location;
predicting whether a read request will be re-tried because the read request will not be fulfilled if the initiator is granted access to the second bus based on a combination of inputs including the transaction history and data availability in the predetermined storage location before allowing the read request to be sent to an arbitrator, the read request associated with the initiator;
masking the read request and one or more read requests being re-tried associated with the initiator such that the read request and one or more read requests being re-tried are not sent to the arbitrator configured to arbitrate access to the second bus when the prediction indicates the read request will be re-tried and the data is not available; and
allowing the read request being re-tried to be sent to the arbitrator such that the arbitrator may arbitrate access to the second bus with the read request being re-tried for the read request when the prediction indicates the data will be available when the read request is allowed access to the second bus.

19. A machine-readable storage medium including instructions executable by a processor for arbitrating a read operation at a bridge device, wherein the bridge device is coupled to first and second buses, wherein an initiator device is coupled to the first bus, wherein a bus protocol requires that the initiator perform retries in order to complete the read operation with a target device coupled to the second bus, the machine-readable storage medium comprising one or more instructions for:

determining transaction history information related to a prior read request by the initiator, the transaction history relating to a result of the prior read request;

determining whether data associated with the prior read request will be available in a predetermined storage location;

predicting whether a read request will be re-tried because the read request will not be fulfilled if the initiator is granted access to the second bus based on a combination of inputs including the transaction history and data availability in the predetermined storage location before allowing the read request to be sent to an arbitrator, the read request associated with the initiator;

masking the read request and one or more read requests being re-tried associated with the initiator such that the read request and one or more read requests being re-tried are not sent to the arbitrator configured to arbitrate access to the second bus when the prediction indicates the read request will be re-tried and the data is not available; and allowing the read request being re-tried to be sent to the arbitrator such that the arbitrator may arbitrate access to the second bus with the read request being re-tried for the read request when the prediction indicates the data will be available when the read request is allowed access to the second bus.

20. The machine-readable storage medium of claim 19, further comprising one or more instructions for masking the read request and the one or more read requests being retried from the initiator device in accordance with a probability that the read request and the one or more read requests being retried will be subjected to a subsequent retry.

21. The machine-readable storage medium of claim 19, further comprising:

one or more instructions for determining that the read request has been re-tried; and one or more instructions for determining that the read request will be re-tried if a grant for the first bus is made to the initiator device.

\* \* \* \* \*